(12) United States Patent
Kolan et al.

(10) Patent No.: US 11,190,554 B2
(45) Date of Patent: Nov. 30, 2021

(54) SYSTEM AND METHOD FOR DISCOVERY AND ACCESS OF UPLINK SERVICES

(71) Applicant: Samsung Electronics Co., Ltd., Suwon-si (KR)

(72) Inventors: Prakash Kolan, Plano, TX (US); Imed Bouazizi, Frisco, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 16/010,221

(22) Filed: Jun. 15, 2018

(65) Prior Publication Data

US 2018/0367579 A1 Dec. 20, 2018

Related U.S. Application Data

(60) Provisional application No. 62/566,880, filed on Oct. 2, 2017, provisional application No. 62/522,376, filed on Jun. 20, 2017.

(51) Int. Cl.
*H04L 29/06* (2006.01)
*H04W 8/00* (2009.01)

(52) U.S. Cl.
CPC ...... *H04L 65/1069* (2013.01); *H04L 65/1006* (2013.01); *H04L 65/4069* (2013.01); *H04W 8/005* (2013.01)

(58) Field of Classification Search
CPC ............ H04L 65/1069; H04L 65/1006; H04L 65/4069; H04W 8/005; H04W 76/12
See application file for complete search history.

(56) References Cited

U.S. PATENT DOCUMENTS

| 6,574,794 B1* | 6/2003 | Sarraf | H04B 7/18515 725/63 |
|---|---|---|---|
| 2003/0140119 A1 | 7/2003 | Acharya et al. | |
| 2006/0034256 A1 | 2/2006 | Addagatla et al. | |
| 2014/0293978 A1 | 10/2014 | Yang et al. | |
| 2015/0006687 A1 | 1/2015 | Baskwill | |

(Continued)

FOREIGN PATENT DOCUMENTS

WO  2016209019 A1  12/2016

OTHER PUBLICATIONS

ISA/KR, "International Search Report and Written Opinion of the International Searching Authority," International Application No. PCT/KR2018/006965, dated Sep. 12, 2018, 12 pages.

(Continued)

*Primary Examiner* — Joe Chacko

(57) ABSTRACT

A method of a device for discovering a receiving device of uplink streams is provided. The method comprises identifying parameters for processing the uplink streams of an uplink service, transmitting, to a network entity, a discovery request message including the parameters for discovery of the receiving device capable of processing the uplink stream, wherein the discovery request message includes a set of parameters for a camera system, receiving, from the network entity, a discovery response message including information of the receiving device of the uplink streams, and establishing a session connection for transmitting the uplink streams to the receiving device for processing the uplink stream based on the discovery request and response messages.

20 Claims, 10 Drawing Sheets

(56) References Cited

U.S. PATENT DOCUMENTS

| | | | |
|---|---|---|---|
| 2015/0327047 A1 | 11/2015 | Tiirola et al. | |
| 2016/0026542 A1* | 1/2016 | Vasseur | G06F 11/1464 714/4.11 |
| 2016/0337838 A1* | 11/2016 | Lee | H04W 48/14 |
| 2016/0353318 A1 | 12/2016 | Liu | |
| 2018/0176856 A1* | 6/2018 | Kim | H04W 4/06 |
| 2020/0178343 A1* | 6/2020 | Kim | H04W 76/18 |

OTHER PUBLICATIONS

Park, K., et al., "Study of ISO/IEC CD 23008-1 MPEG Media Transport," MPEG-H Systems, International Organization for Standardization, ISO/IEC JTC1/SC29/WG11, Coding of Moving Pictures and Audio, MPEG/N13089, Shanghai, China, Oct. 12, 2012, 124 pages.

Campbell, B., et al., "Session Initiation Protocol (SIP) Extension for Instant Messaging," RFC: 3428, Dec. 2002, 17 pages.

Berger, A., et al., "Power Ethernet MIB," RFC:3621, Dec. 2003, 19 pages.

Johnston, A., et al., "Session Initiation Protocol (SIP) Basic Call Flow Examples," RFC: 3665, Dec. 2003, 94 pages.

Rosenburg, J., et al., "Caller Preferences for the Session Initiation Protocol (SIP)," RFC: 3841, Aug. 2004, 26 pages.

Rosenburg, J., "Identification of Communications Services in the Session Initiation Protocol (SIP)," RFC: 5897, 23 pages.

Drage, K., "A Session Initiation Protocol (SIP) Extension for the Identification of Services," RFC: 6050, Nov. 2010, 19 pages.

Holmberg, C., et al., "Session Initiation Protocol (SIP) Info Method and Package Framework," RFC: 6086, Jan. 2011, 36 pages.

Fielding, R., et al., "Hypertext Transfer Protocol (HTTP/1.1): Semantics and Content," RFC: 7231, Jun. 2014, 102 pages.

Samsung Electronics Co., Ltd., et al., "New WID on Framework for Live Uplink Streaming", 3GPP TSG SA WG-4 Meeting #93, Apr. 24-28, 2017, S4-170469, 3 pages.

Supplementary European Search Report dated Mar. 3, 2020 in connection with European Patent Application No. 18 82 0237, 9 pages.

Communication pursuant to Article 94(3) EPC in connection with European Application No. 18820237.8 dated Aug. 10, 2020, 5 pages.

* cited by examiner

SYSTEM AND METHOD FOR DISCOVERY AND ACCESS OF UPLINK SERVICES

CROSS-REFERENCE TO RELATED APPLICATION(S) AND CLAIM OF PRIORITY

The present application claims priority to U.S. Provisional Patent Application Ser. No. 62/522,376, filed on Jun. 20, 2017; and U.S. Provisional Patent Application Ser. No. 62/566,880, filed on Oct. 2, 2017. The content of the above-identified patent documents are incorporated herein by reference.

TECHNICAL FIELD

The present application relates generally to uplink services. More specifically, this disclosure relates to discovery and access procedures for the uplink services in a communication network.

BACKGROUND

A network operator (e.g., 3G, 4G/LTE, 5G operator) provides connectivity services to end users. As part of the end-to-end connectivity, the end user clients are usually connected to the operator core network using radio access networks such as E-UTRAN, 5G NR etc. The services that the end user clients can access could be the services provided by the network operator itself or the services provided by 3$^{rd}$ party service providers that use operator's network to deliver their services to interested users. One of the services that is slowly gaining traction is the uplink service. In this service, a user behind a radio access network (such as 5G NR, WiFi), can register or subscribe to an uplink service which can host content from the end users and distribute the content later to interested users. This uplink service can either be managed by the network operator or by an external 3$^{rd}$ party service provider on behalf of the network operator. Network operators or 3$^{rd}$ party providers can provision uplink services with different characteristics (so network operators or 3$^{rd}$ party providers support a varied set of uplink service requirements). It is highly possible that these uplink services are provisioned dynamically, in which case, there needs to be methods defined for discovery of these uplink services by the UE so the user can use the uplink service of his choice. In addition, once the uplink services are discovered, an access mechanism is needed for end user clients to use to connect to the chosen uplink service and upload content for later distribution.

SUMMARY

Embodiments of the present disclosure provide beam recovery scheme in an advanced wireless communication system.

In one embodiment, a device for discovering a receiving device of uplink streams is provided. The device includes a processor configured to identify parameters for processing the uplink streams of an uplink service. The device further includes a transceiver operably connected to the processor and the transceiver configured to transmit, to a network entity, a discovery request message including the parameters for discovery of the receiving device capable of processing the uplink streams. The discovery request message includes a set of parameters for a camera system, and receive, from the network entity, a discovery response message including information of the receiving device of the uplink streams. The processor is further configured to establish a session connection for transmitting the uplink streams to the receiving device for processing the uplink stream based on the discovery request and response messages.

In another embodiment, a network entity for discovering a receiving device of uplink streams is provided. The network entity includes a transceiver configured to receive, from a device, a discovery request message including parameters for discovery of a receiving device capable of processing the uplink stream. The discovery request message includes a set of parameters for a camera system. The transceiver is further configured to transmit, to the device, a discovery response message including information of the receiving device of the uplink stream. The network entity further includes a processor operably connected to the transceiver, the processor configured to identify parameters for processing the uplink streams of an uplink service from the device and establish a session connection for receiving the uplink stream from the device for processing the uplink stream based on the discovery request and response messages.

In yet another embodiment, a method of a device for discovering a receiving device of uplink streams is provided. The method comprises identifying parameters for processing the uplink streams of an uplink service from the device, transmitting, to a network entity, a discovery request message including the parameters for discovery of the receiving device capable of processing the uplink stream, wherein the discovery request message includes a set of parameters for a camera system, receiving, from the network entity, a discovery response message including information of the receiving device of the uplink streams, and establishing a session connection for transmitting the uplink streams to the receiving device for processing the uplink stream based on the discovery request and response messages.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein:

3GPP TS 26.346 v15.0.0, "Multimedia Broadcast/Multicast Service (MBMS); Protocols and codecs;" 3GPP TS 26.234 v15.0.0, "Transparent end-to-end Packet-switched Streaming Service (PSS); Protocols and codecs;" RFC 3261, "SIP: Session Initiation Protocol;" RFC 7231, "Hypertext Transfer Protocol (HTTP/1.1): Semantics and Content;" "Study of ISO/IEC CD 23008-1 MPEG Media Transport;" RFC 6050, "A Session Initiation Protocol (SIP) Extension for the Identification of Services;" RFC 5897, "Identification of Communications Services in the Session Initiation Protocol (SIP);" RFC 3841, "Caller Preferences for the Session Initiation Protocol (SIP);" RFC 3665, "Session Initiation Protocol (SIP) Basic Call Flow Examples;" RFC 3428, "Session Initiation Protocol (SIP) Extension for Instant Messaging;" and RFC 6086, "Session Initiation Protocol (SIP) INFO Method and Package Framework."

Figure 1:
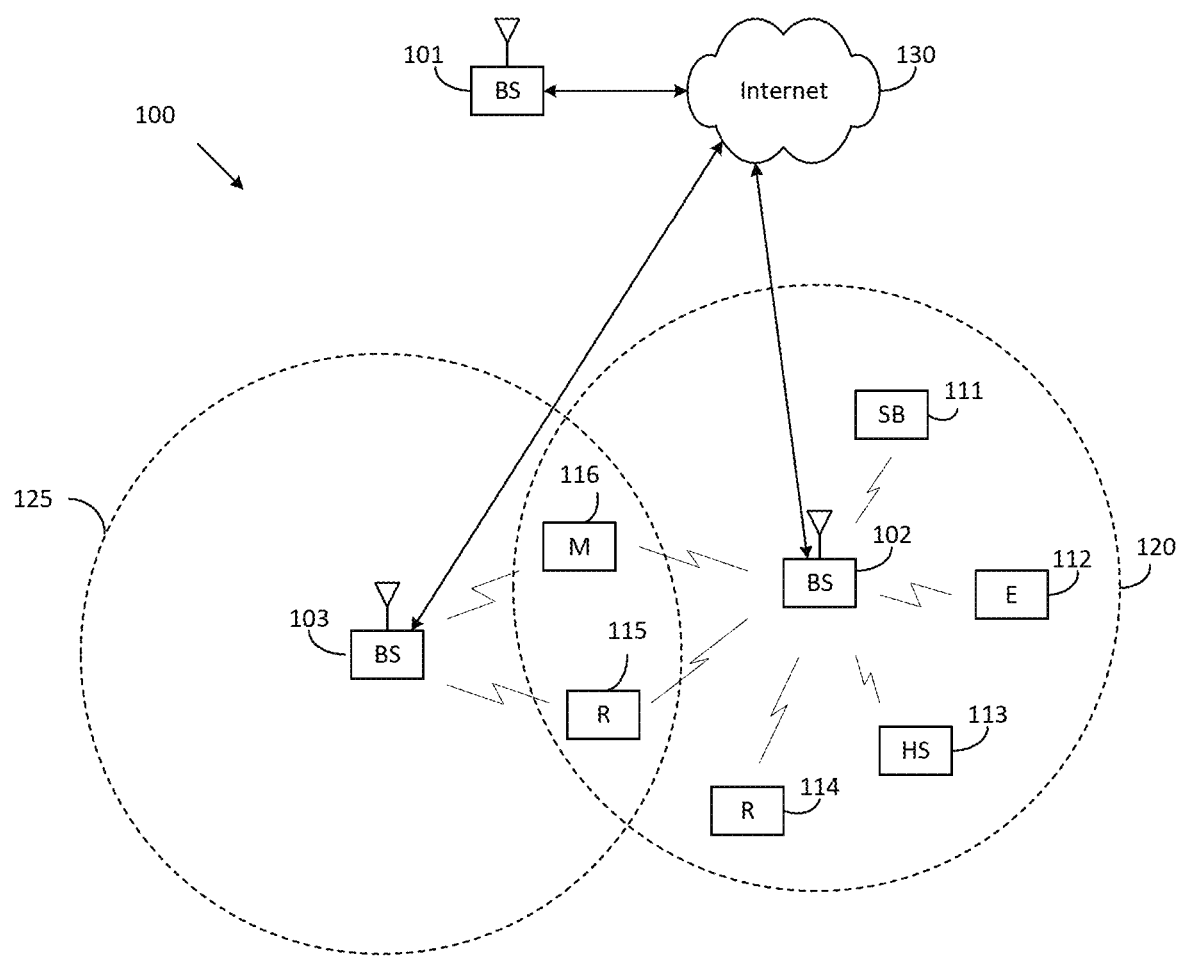
FIG. 1 illustrates an example wireless network according to embodiments of the present disclosure.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient beam recovery in an advanced wireless communication system. In certain embodiments, and one or more of the eNBs 101-103 includes circuitry, programming, or a combination thereof, for receiving efficient beam recovery in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

Figure 2:
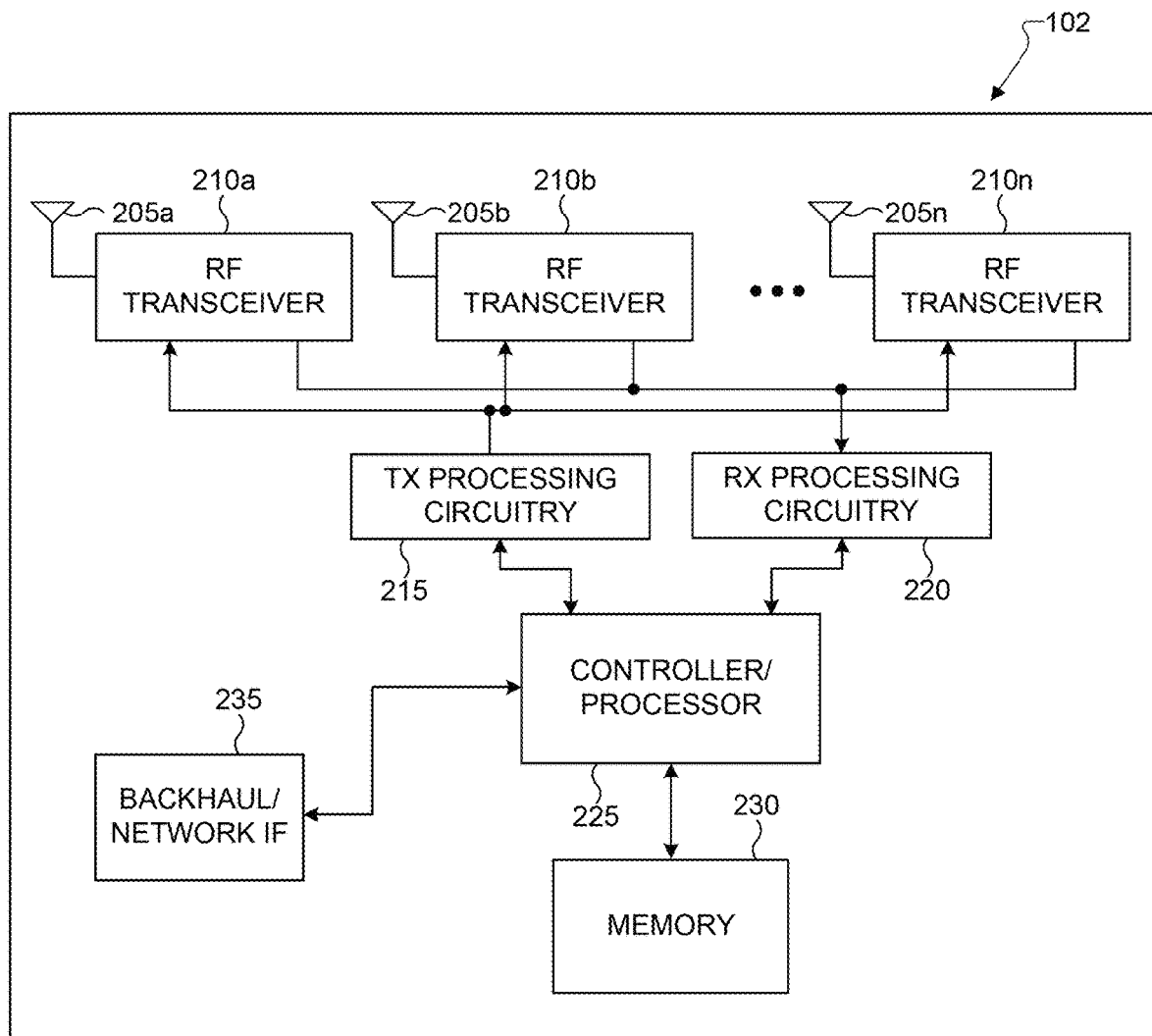
FIG. 2 illustrates an example eNB according to embodiments of the present disclosure.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
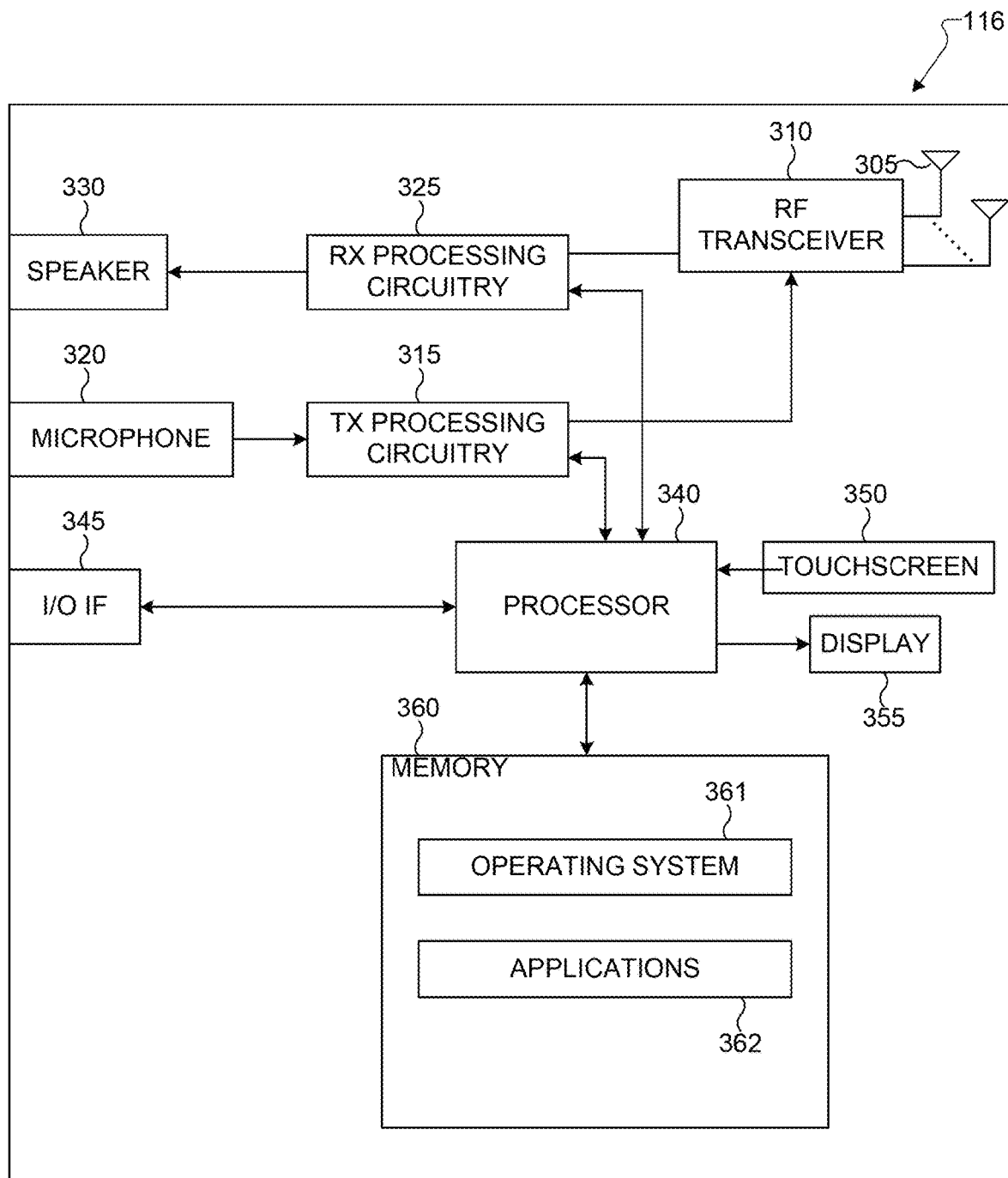
FIG. 3 illustrates an example UE according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The network operator, or a $3^{rd}$ party service provider on behalf of the operator, can setup up uplink services. In this disclosure, following embodiments are provide: uplink service discovery so that end users can discover available uplink services in the PLMN the end users currently reside; procedure for accessing uplink service using control protocols and APIs; and bootstrapping session setup protocols using APIs so end user clients and uplink services successfully setup sessions for content upload and streaming.

Following are the new features described in the present disclosure: DNS records that help resolve the location of uplink service to the UE; discovery of an uplink service based on interested service features; signaling mechanism for accessing available uplink services; and selection of FLUS sink based on FLUS source characteristics and capabilities.

Through the embodiments provided by the present disclosure, following advantages are provided: be able to resolve the location of the available uplink services provided by the operator or a $3^{rd}$ party service provider on behalf of the operator; provision domain names of uplink services using different methods such as pre-configuration, device management, and DNS; discovery of subset of uplink services based on interested features; and signaling mechanisms for end user clients to access the available uplink services.

Figure 4:
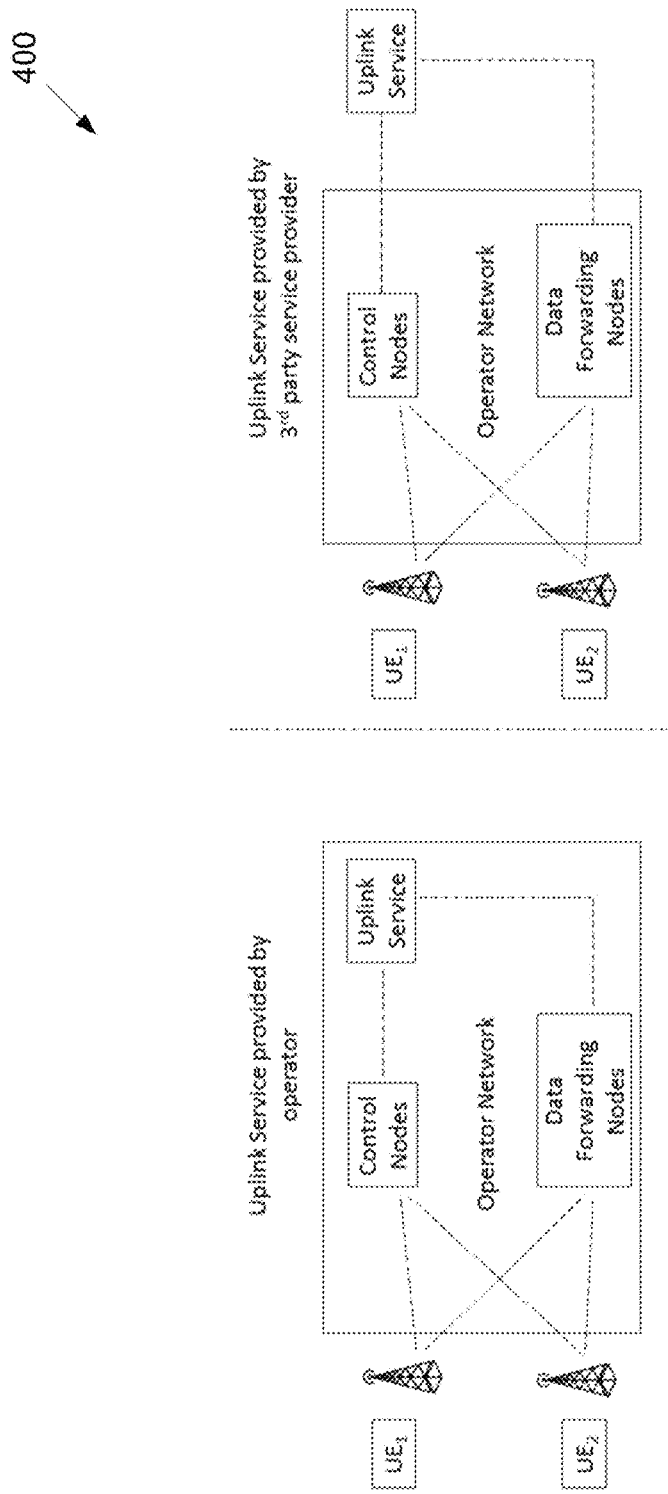
FIG. 4 illustrates an example uplink service architecture in operator's network according to embodiments of the present disclosure.

FIG. 4 illustrates an example uplink service architecture in operator's network 400 according to embodiments of the present disclosure. The embodiment of the uplink service architecture in operator's network 400 illustrated in FIG. 4 is for illustration only. FIG. 4 does not limit the scope of this disclosure to any particular implementation.

FIG. 4 shows a simple architecture of uplink services that are provided by the operator or by an external $3^{rd}$ party service provider. If the uplink services are provided by the operator, the uplink services reside in the operator PLMN and are accessible to the users. On the other hand, a $3^{rd}$ party service provider can also provide an uplink service to operator's users by having business agreements with the operator. From herein, it is referred to the provider of uplink services, either the network operator or the $3^{rd}$ party service provider, as uplink service provider.

Once the uplink service is deployed, the users of the operator (e.g., $UE_1$) can setup one or more media sessions to upload service content to the uplink service. The media session setup between the end user and the uplink service is done through the control nodes of the operator network, while the actual service content flows from the end user to the uplink service through the data forwarding nodes of the operator network as shown in FIG. 4. Any time after the content upload, depending on the service configuration as setup by the end user, the uplink service can distribute the content to interested users in the downlink direction (e.g., $UE_2$).

For realizing the uplink service, there are many steps that are required to be performed before the uplink service starts delivering the content to interested users in downlink direction. These steps are discussed in detailed below.

In one step of domain names for uplink services, as a first step towards the discovery of available uplink services, the end user clients have to be aware of domain names of all uplink service providers supported by the operator. In one embodiment of this disclosure, it is provided that all the domain names of different uplink service providers may be pre-configured in the device. Alternative domain name configuration options are provided in subsequent embodiments.

When the domain names of all the available uplink service providers are pre-configured in the system, the end user client, when the end user client intends to use an uplink service, can pick one of the domain names in the pre-configured domain name list of uplink service providers for the domain names use. The criteria for selecting one uplink service provider among all the uplink service providers is left to the end user and could be dependent upon the features provided by the uplink service, charges for using the uplink service, operator policy etc. Once the end user chooses an uplink service provider, the end user client can use the domain name of the chosen uplink service provider to discover location of uplink services as described in next section.

In one step of uplink service discovery, once the end user chooses an uplink service provider, the end user client can proceed to discover the uplink service the end user client wants to use. The discovery of uplink service can be done in two different ways: discover all available uplink services and then filter what services the end user wants to use; and discover available uplink services that support specific features required by the end user.

In one step of discovery of all Available uplink services and then filter for interested ones, in this type of discovery, the end user client, through the discovery mechanisms, first discovers the list of all available uplink services. Then the end user client can choose an uplink service that the end user client wants to use and proceed to obtain the capabilities of the uplink service as described in this section. Optionally, if the end user client cannot decide on an uplink service, then the end user client can obtain the capabilities of all available uplink services and then choose one uplink service that the end user client is interested in.

One way of discovering available uplink services is through domain name service (DNS) records. The network operator configures the DNS with uplink service location information so the end user can discover the location and supported features of those uplink services as described below.

For discovery of available uplink services provided by an uplink service provider, the network operator creates DNS SRV records as follows. For service records, the DNS SRV record format is given by: _service._proto.domainname. TTL class SRV priority weight port target.

For uplink service, it is provided to create a new DNS SRV record with service name "flus." So, with the service name "flus" and uplink provider domain name (e.g., "operator.com"), the network operator creates a DNS SRV record for uplink service as shown in the following example: _flus._TCP.operator.com. 86400 IN SRV 5 10 8080 api.operator.com.

As defined in the above DNS SRV record, the service "flus" can be reached at the location api.operator.com at port 8080 and protocol TCP with a priority value of 5 and weight value of 10. Similar to above record, the operator can define additional locations (target and port) with a different priority and weight value. Depending on the priority and weight value, when a request to access service "flus" comes to the operator DNS, the DNS server may resolve the request to a particular target. Once the location is resolved, the end user client is now aware of the location of the uplink service at the uplink service provider.

Optionally, the uplink service can also provide a SIP end point and provide these details using another DNS SRV record. So, with the service name "flus" and uplink provider domain name (e.g., "operator.com"), the network operator creates a DNS SRV record for uplink service as shown in the following example: for SIP over TCP: _flus._TCP.operator.com. 86400 IN SRV 5 10 5060 sip.operator.com.; and for SIP over UDP: _flus._UDP.operator.com. 86400 IN SRV 4 10 5060 sip.operator.com.

The end user client can retrieve the DNS SRV record as defined above to know the location of the uplink service. However, more information about the service cannot be delivered using the DNS SRV record. For this reason, DNS TXT record is used to inform end user clients of optional information about the uplink service. For TXT records, the DNS TXT record format is: _service.domainname. TTL class TXT "param_1=value_1; param_2=value_2 . . . param_2; . . . param_n=value_n" where param_1 . . . param_n are the "n" number of parameters whose values are value_1 . . . value_n, respectively.

For uplink service, it is provided to create a new DNS TXT record with service name "flus." So, with the service name "flus" and uplink provider domain name (e.g., "operator.com"), the network operator creates a DNS TXT record for uplink service as shown in the following example: _flus.operator.com. 86400 IN TXT "supported_control_protocols={sip, http, MMT}; http_uri=/uplinkservices."

From the above TXT record, it can be observed that the uplink service "flus" supports control protocols SIP, HTTP, and MMT, and the URI for accessing through HTTP is /uplinkservices.

Using both the DNS SRV and TXT records, the end user client can construct a complete HTTP URI api.operator.com/uplinkservices and access this URI at target location api.operator.com and port 8080.

In DNS TXT records, various parameters can be included that gives more information about the service. TABLE 1 shows the different parameters that can be included in the TXT records to give more information about uplink service to the end user clients.

TABLE 1

List of parameters in DNS TXT Record for Uplink Service

| Parameter Name | Description | Example Values |
| --- | --- | --- |
| supported_features | List of supported features by the uplink service | 360 switching, rendering, exposure correction, color matching, feature tracking |
| supported_control_protocols | List of supported control protocols for session setup with source UE | SIP, HTTP, MMT |
| http_uri | HTTP URI if source UE intends to use API for signaling session setup | /uplinkservices |

TABLE 1-continued

List of parameters in DNS TXT Record for Uplink Service

| Parameter Name | Description | Example Values |
| --- | --- | --- |
| signaling_bootstrap | Support for control protocol negotiation | start = http; continue = sip |
| uplink-service-delivery-method | Supported uplink content upload methods | file upload, streaming |
| uplink-security-config | Available security configuration (secure communication methods, authentication methods, authorization methods etc.) for content upload | |
| transcoding | Supported content transcoding facilities indicated through supported audio, video, text, and other media formats | mp3, mpegts, mpeg2ts, mp4 |
| hosting-threshold | Maximum time allowed for content hosting | 604800 seconds (for 1 week hosting period) |
| downlink-service-delivery-method | Supported downlink delivery methods for later distribution | unicast, broadcast, multicast, or a combination of above |
| downlink-security-config | Available security configuration (secure communication methods, authentication methods, authorization methods etc.) for downlink content distribution | |
| downlink-fec | Support for FEC during downlink content distribution | AL-FEC |
| downlink-file-repair | Support for file repair during downlink content distribution | |
| downlink-qos | Supported QoS configurations for downlink content distribution | max-bandwidth = 4096K; max-delay = 1 ms |
| downlink-service-announcement-mode | Announcement of service details for downlink distribution | http, |
| downlink-reporting-configuration | Type of reporting available in downlink direction | qoe, consumption |
| push-configuration | Push configuration to indicate support of notification to source UE | |

Once the end user client decides on an uplink service that the end user client wants to use and is aware of all the capabilities of the said uplink service, the end user client can proceed to perform session setup with that uplink service.

In one embodiment of discovery of all available uplink services that support specific features, with this type of discovery, instead of discovering all available uplink services at the uplink service provider, the end user client can discover uplink services that support specific features that the end user is interested in. As a result of this discovery mechanism, the end user client only has a subset of uplink services from which the end user client has to choose an uplink service. The advantage of this discovery mechanism over the previous mechanism is that, using this mechanism, the operator has more control on uplink service selection by the end user client.

This mechanism of discovering uplink services that support specific features can be done by extending DNS. It is provided to enhance the DNS request from the end user client to DNS server to include a field called "interested_features" whose value provides the list of features the end user is interested in. When the DNS server gets this request, the DNS returns back with DNS records (SRV and TXT records in format described before) of only those uplink services that support the features requested by the end user client.

Once the end user client gets the subset of uplink services, the end user client can decide on the uplink service the end user client is interested in and then proceed to setup session with that uplink service as described in the next section.

In one embodiment of discovery of FLUS sink based on source characteristics and/or capabilities, uplink services or a FLUS sink can be selected based on source characteristics and/or capabilities (e.g., camera parameters when the source has a camera arrangement at the capturing side). When a request from the end user with capability or characteristics information of the capturing system comes to the FLUS service operator, a FLUS sink can be dynamically selected and provisioned based on the information in the incoming request. The FLUS operator can choose an appropriate FLUS sink based on this information instead of pre-configuring a generalized FLUS sink to service a request from a source with any kind of capabilities and/or characteristics.

Alternatively, the FLUS operator can publish a directory of FLUS sinks that support a given set of source characteristics and/or capabilities. Such information can be published using the DNS SRV and TXT records described earlier. When FLUS source devices require to use a FLUS sink, the FLUS source devices can use such DNS information to infer appropriate FLUS sinks as FLUS source devices are aware of their own characteristics/capabilities and the characteristics/capabilities of all FLUS sinks provided by the FLUS operator.

In one embodiment of service configuration and session setup with uplink services, once the end user client chooses an uplink service the end user client wants to use, the end user client can proceed with service configuration and signaling session setup using any of the control protocols supported by the uplink service (as indicated using supported_control_protocols parameter in Table-1). In such embodiment, a mechanism is provided for session setup using REST APIs that uses HTTP protocol. In one embodiment, an alternate method of session setup using an offloaded control protocol is provided.

Using REST APIs, the end user client can configure a service and setup a session with the uplink service as shown in the below example:

```
POST /uplinkservice/sessions
Host: operator.com
Content-Type: <content-type>
Content-Length: <content-length>
<
    uplink-sdp: <sdp>
    service-languages: <Service language>
    service name: <Service Name>
    push-configuration: <Push configuration>
    downlink-service-delivery-method: <Downlink service delivery
    method sought>
    transcoding: <Transcoding sought>
    downlink-security-configuration: <Downlink security configuration
    sought>
    user-list: <List of users>
    service-time: <Time of service>
    apply-fec: <Type of FEC to be applied>
    request-file-repair: <Flag to request file repair>
    downlink-qos: <QoS configuration sought during downlink
    dstribution>
    service-announcement-mode: <Recommended service announcement
    mode>
    service-announcement-start-time: <Time to start service
    announcement>
    downlink-reporting-configuration: <Reporting Configuration>
>.
```

As shown above, the end user UE can request a session setup using REST API with the uplink service. TABLE 2 shows a brief description of each of the content body fields inside the POST request.

Based on the POST request from the end user client with fields described above, the uplink service can return back to the end user client with a 200 OK success message as described below:

```
HTTP/1.1 200 OK
Location: /uplinkservice/serviceId
Content-Type: <content-type>
Content-Length: <content-length>
<
>.
```

Using the 200 OK response message, the uplink service can acknowledge the receipt of session creation request. Optionally, if the uplink service requests end user authentication, the uplink service can respond back with a 401 message. If the request cannot be fulfilled, the uplink service can respond back with a 403 Forbidden message.

Figure 5:
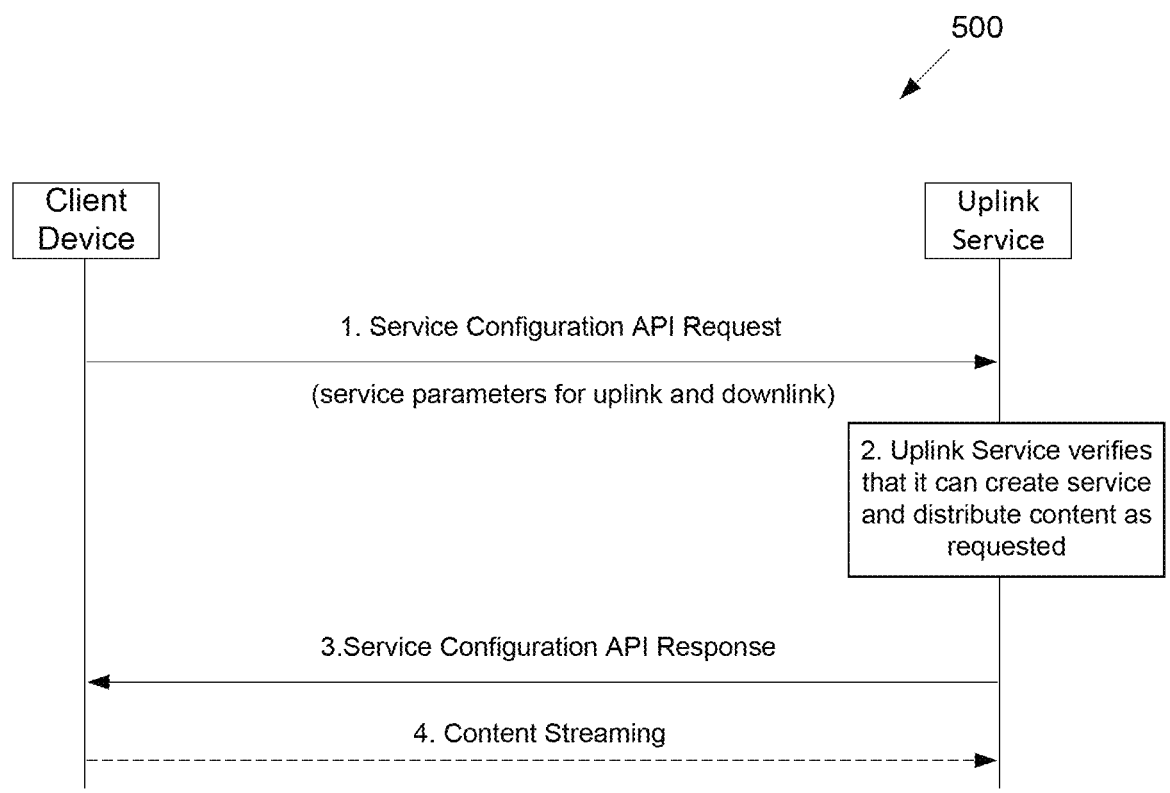
FIG. 5 illustrates an example session setup procedure with uplink services according to embodiments of the present disclosure.

FIG. 5 illustrates an example session setup procedure 500 with uplink services according to embodiments of the present disclosure. The embodiment of the session setup procedure 500 illustrated in FIG. 5 is for illustration only. FIG. 5 does not limit the scope of this disclosure to any particular implementation.

Once the end user client receives a success message from the uplink service, the end user client can start uploading content to uplink service. After all the content is received from the end user client, the uplink service can perform downlink content distribution as described later in the disclosure. The above session setup procedure is as shown in FIG. 5.

TABLE 2

List of parameters in Session setup requests to Uplink Service

| Field Name | Field Description |
| --- | --- |
| service-languages | List of service language names of the content |
| service-name | Service name |
| push-configuration | Configuration to inform uplink service of push notifications (e.g., where and how the UE can receive notifications) |
| downlink-service-delivery-method | Downlink delivery method sought for content distribution to interested users. The delivery method requested may be one of the delivery methods supported by the uplink service as indicated in the DNS TXT records |
| Transcoding | Type of transcoding the source UE wants the uplink service to perform before distributing the content in downlink direction to other interested users. The requested transcoding may be supported by the uplink service as indicated in the DNS TXT records |
| downlink-security-configuration | Security configuration sought by the source UE during downlink content distribution |
| user-list | List of users the content can be distributed to during downlink distribution. This list for example could be a list of MSISDN numbers |
| service-time | Start time for distributing content in downlink direction |
| apply-fec | Indicates request to apply FEC in downlink direction. The requested FEC may be one of the FEC methods supported by the uplink service as indicated in the DNS TXT records |
| request-file-repair | Indicates request to setup a file repair service if delivering content as file download |
| downlink-qos | QoS configuration sought during content distribution in downlink direction |
| service-announcement-mode | Recommended (by the source UE) service announcement mode from the uplink service to all interested users |
| service-announcement-start-time | Start time to send service announcement using the service-announcement-mode to interested users |
| downlink-reporting-configuration | Reporting sought during content distribution in downlink direction. The reporting configuration may be based on the reporting capabilities of uplink service as indicated in DNS TXT records |

In one embodiment of session setup using offloaded control protocol, as discussed in previously, the end user client can configure services and setup sessions with an uplink service. However, it is also possible that the end user client and uplink service can offload certain aspects of the signaling setup to another control protocol.

In the aforementioned embodiment, an example session setup with offloading to SIP protocol is provided. To offload session setup to SIP, the end user and uplink service do the following.

In one example, the end user client can retrieve the DNS SRV and TXT records as described in the aforementioned embodiments to retrieve service location and other service information. From the supported_control_protocols parameter in DNS TXT record, the end user client can infer that the uplink service supports other control protocols (e.g., SIP).

In one example, using the REST API invocation as described in aforementioned embodiments, the end user client can configure the service and start session setup with the uplink service. In the POST request to the uplink service, the end user client can include a field called "offload-control-protocol" and set the field's value to "sip."

In one example, when the uplink service receives this POST request, the uplink service acknowledges the switch over to offload control protocol using the field "offload-control-protocol" with value "sip" inside the 200 OK message to the end user client.

In one example, when the end user client receives a 200 OK message with field "offload-control-protocol" with value "sip," the end user client infers that the uplink service is ready to switch to control protocol SIP. The end user client may then switch to using SIP.

In one example, the end user client may then find the location of uplink SIP service as described in the aforementioned embodiments. Optionally, the uplink service can give the SIP endpoint location in the 200 OK message to end user client in step-3 above. The end user client may send SIP requests to continue the session setup process.

Figure 6:
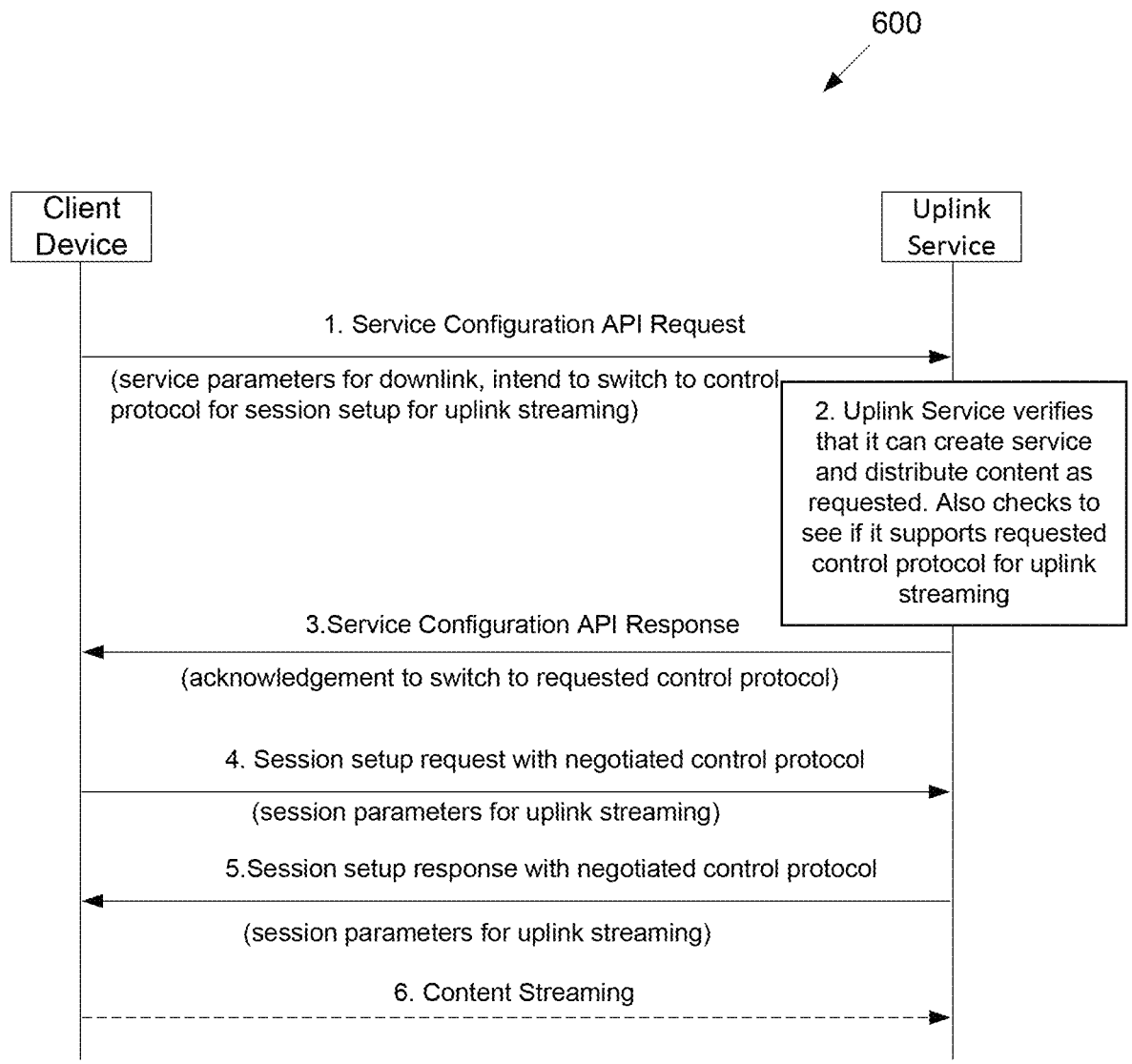
FIG. 6 illustrates an example session setup procedure using offloaded control protocol according to embodiments of the present disclosure.

FIG. 6 illustrates an example session setup procedure 600 using offloaded control protocol according to embodiments of the present disclosure. The embodiment of the session setup procedure 600 illustrated in FIG. 6 is for illustration only. FIG. 6 does not limit the scope of this disclosure to any particular implementation.

The end user client and uplink service can proceed with normal SIP signaling to continue and complete the session setup process. Once the session is setup, the end user client can stream content to the uplink service which the uplink service can later distribute in downlink direction as described later in the disclosure. The above session setup procedure that starts with an API and ends with an offloaded control protocol can be shown in FIG. 6.

In one embodiment of correlation during offloading to control protocol, using the offloading to control protocol procedure described above, the end user client switches from one signaling mechanism (e.g., REST API) to another (e.g., SIP). During this switch, it is required that the end points hold the state so the end points know which signaling of the former (e.g., REST API) corresponds to which signaling of the later (e.g., SIP).

To support the correlation between these two signaling mechanisms, it is provided that a unique identifier is provided from one signaling mechanism to another signaling mechanism. When the end points negotiate with the first signaling mechanism, the end user client includes this unique identifier which the uplink service end point caches and saves the unique identifier. Later when the end user client and uplink service endpoint decide to switch to another control protocol, the end user client may include the unique identifier in second signaling mechanism to the uplink service end point so the uplink service knows which session in first signaling mechanism corresponds to which session using second signaling mechanism.

With the above correlation, the session setup using the two signaling mechanisms REST API and SIP is as described below.

In one example, end user client sets up a session with REST API as described before, but with a minor change. In the session setup request using REST API, the end user sends a field called "session_identifier" whose value is a unique numeric string (e.g., "Offload_Identifier_Value"). When the uplink service endpoint receives the session setup request with this identifier, the uplink service endpoint saves the identifier for later signaling mechanism offload.

In one example, the end user client and uplink service endpoint switch to control protocol SIP as described before, but with one minor change. The end user client enhances the SIP signaling request using any of the following mechanisms. In one instance, introduce a field called "X-Offload-Identifier" in SIP message with the same value "Offload_Identifier_Value" as generated above. In another instance, enhance the Origin field of SDP. One of the parameters in origin field of SDP is "session-id". For the session-id value of Origin field, it is provided to include the value of "Offload_Identifier_Value" generated above. In yet another instance, enhance SDP with a value attribute called "Offload_Identifier" whose value is same as "Offload_Identifier_Value" generated above. For example, the value attribute in SDP may appear as "a=Offload_Identifier:<Offload_Identifier_Value>."

Based on the unique identifier in either SIP or SDP described above, the uplink service endpoint may clearly know which REST API session does this SIP signaling corresponds to: the end user client and uplink service end point can complete the session setup using SIP as described before.

In one embodiment of downlink distribution of content, once the end user client sets up session with uplink service using any of the methods described before, the end user client starts streaming content to the uplink service. The uplink service can then optionally transform the content (e.g., transcoding, application of features) as requested by the end user client and host the content. Depending on the service configuration, the uplink service may distribute the content to downlink users using techniques such as MBMS and PSS.

Device management techniques such as OMA can be used for configuring/providing information of uplink services to the end user clients. Different levels of information can be provided such as: domain names of uplink services which the end user clients can use along with DNS records to retrieve the list of uplink services provided by the service provider and then further lookup the location of each of the interested uplink service; list of available uplink services with detail information (as described in TABLE 1) about each of the uplink service. When the end user client receives detail information of each of the available uplink service, the client can decide on the uplink service the client is interested in and can directly proceed to setup a session with the chosen uplink service as described in the embodiment; and location of uplink service directory service which the end user client can query to discover available uplink services and details about interested uplink services.

In one embodiment of uplink service discovery using "uplink service directory," as specified in the aforementioned embodiments, sometimes it could be an overkill to have DNS SRV and TXT records of each and every uplink service offered in the operator network. A solution to this problem is a service called uplink service directory (USD). An USD is a service that holds a repository of all uplink services in the operator domain. Instead of configuring the SRV records of each of every uplink service offered in the PLMN, the operator can just configure the SRV record of the USD in the operator domain as follows: _flus._TCP.operator.com. 86400 IN SRV 5 10 6060 usd.operator.com.

The end user clients, as described in other embodiments, are either pre-configured or informed through device management techniques with the domain name where the USD service is hosted. Once the end user clients have the domain name, the end user clients use the above DNS SRV record to retrieve the location of the USD service in the operator network. The USD service can host an HTTP server and offer end points (e.g., REST end point) for end user clients to query. To signal the capability of HTTP service to end users, the operator can configure a DNS TXT record such as the following: _flus.operator.com. 86400 IN TXT "http_uri=/getuplinkservices."

Using the DNS SRV and TXT records the end user clients can compose the HTTP URI of the USD service. The end user client can then send a GET request using REST API to the USD service to retrieve the set of all uplink services offered in the operator network as shown below:

```
GET /getuplinkservices
Host: operator.com.
```

When the USD service gets a GET request from the end user client, the USD service can respond back with a 200 OK message which includes the list of all uplink services offered in the operator network as shown below:

```
HTTP/1.1 200 OK
Content-Type: <content-type>
Content-Length: <content-length>
[
    {
        "service":"uplink_service_1",
        "location": "api.operator.com:8080"
        // other service information such as described in Table 1
    }
// other uplink services
].
```

After retrieving the list of all available uplink services, the end user client can choose an uplink service that the user is interested in, and then proceed to setup sessions with an uplink service as described in the embodiments. Alternatively, the 200 OK response can contain only the location information of each of the available uplink service. In this case, the end client can send a GET service to with URI/getuplinkservices/service Id to receive the detail information of the uplink service with Id serviceId which the end client is interested in.

With demands from enhanced multimedia applications are ever increasing (e.g., to provide services such as AR, 6DoF etc.), it becomes more significant that content processing components become more application aware that can provide required level of processing capabilities to the end user. As a result, generalized media processing components cannot serve the diverse type of requests from the source. In case of FLUS, it is expected that the capturing modalities may differ quite significantly. So, the FLUS operator may be required to provide processing infrastructure that can cater to the exact requirements by the end user capturing devices.

In this embodiment, capturing characteristic/capability information is provided using camera parameters that can be sent to FLUS operator so appropriate FLUS sinks can be selected for serving the requests generated from that end user device.

For a capturing system at the FLUS source with one camera, when the capturing system at the FLUS source has only one camera in the arrangement, it is provided that all the characteristics of the camera be sent in the request to the FLUS operator so an appropriate FLUS sink can be selected based on the included characteristics. For example, one or more of the following camera parameters can be sent as characteristics information to the FLUS operator for the single camera so an appropriate FLUS sink can be selected as shown in TABLE 3.

TABLE 3

| Characteristic information for camera | |
| --- | --- |
| Parameter | Parameter |
| Camera video capture format | Skew coefficient |
| Camera resolution | Rotation |
| Camera frames per second | Field of View |
| Camera image capture format | Translation |
| Lens mode (e.g., single or dual mode) | Digital sensor width |
| Lens Distortion | Image width in pixels |
| Focal Length | Desired resolution of output image |
| Image Sensor Format | Resolution of output video |
| Principal point offset | Level of blending |
| Axis skew | |

If the camera has audio recording capabilities, one or more of the following camera parameters can be sent as audio characteristics information to the FLUS operator so an appropriate FLUS sink can be selected as shown in TABLE 4.

TABLE 4

| Audio characteristics information | |
| --- | --- |
| Parameter | Parameter |
| Type of microphone | Output Sample rate |
| Audio format | Audio channel azimuth |
| Number of channels | Audio channel elevation |
| Audio sample rate | |

For a capturing system at the FLUS source with multiple cameras in a camera arrangement, if the capturing system at the FLUS source has multiple cameras in the camera arrangement, one or more of the following set of parameters can be sent to the FLUS operator so an appropriate FLUS sink can be selected as shown in TABLE 5.

TABLE 5

| Parameters for FLUS operator | |
| --- | --- |
| Parameter | Parameter |
| Number of Cameras | Relative position of each camera in the camera arrangement |

TABLE 5-continued

Parameters for FLUS operator

| Parameter | Parameter |
| --- | --- |
| Type of Camera (e.g., mono, stereo, etc.) | Orientation (e.g., yaw, pitch, roll of each camera in the camera arrangement) |
| Location (e.g., gps coordinates + reference coordinate system of the main camera arrangement (rig) GPS Positioning (e.g., indoor GPS, outdoor GPS) | Field of view of each lens |

In addition to the camera arrangement information such as above, individual parameters of each camera as described earlier can also be sent to the FLUS operator so an appropriate FLUS sink can be selected.

If multiple cameras in the camera arrangement also have audio recording capabilities, following set of parameters can be sent to the FLUS operator so an appropriate FLUS sink can be selected as shown in TABLE 6.

TABLE 6

Parameters for the FLUS sink

| Parameter | Parameter |
| --- | --- |
| Location of microphones | Number of microphones |

In addition to the audio information about the arrangement such as above, individual audio parameters of each camera as described earlier can also be sent to the FLUS operator so an appropriate FLUS sink can be selected.

In one embodiment for a well-known capturing system with only one camera at the FLUS source, if the capturing system at the FLUS is a well-known capturing system with one camera, it is provided that a well-known camera identifier may be sent to the FLUS operator so the operator can select an appropriate FLUS sink for the request. Optionally, the FLUS source can also send individual camera video and audio characteristics for the camera as defined earlier to the FLUS operator.

In one embodiment for a well-known capturing system at the FLUS source, if the capturing system at the FLUS is a well-known capturing system with multiple cameras (e.g., GoPro Omni, Facebook Surround 360, Samsung Gear 360 etc.), it is provided that a well-known camera system identifier be sent to the FLUS operator so the operator can select an appropriate FLUS sink for the request. Optionally, the FLUS source can also send camera arrangement information and individual camera video and audio characteristics for each camera in the camera arrangement as defined earlier to the FLUS operator.

As described in the aforementioned embodiment, DNS SRV and TXT records can give uplink service or FLUS sink information that the end user clients can use to select appropriate FLUS sink. In addition to the parameters described in the embodiments, the DNS TXT records can also give information about the camera parameters described in alternative embodiment 3 above. When such parameters are incorporated into the DNS system, when the end user clients read the DNS SRV and TXT records as described in aforementioned embodiments, the end user clients can now select FLUS sinks not only based on the type of services, but also based on the type of characteristics or capabilities (e.g., camera parameters) of the end user clients. As a result, such FLUS sinks can only be restricted to be used with FLUS source devices that possess such kind of capabilities.

In the present disclosure, method for discovery of uplink services based on uplink service capabilities and end user requirements is provided. In the present disclosure, uplink services and their capabilities that are published inside the operator network is provided.

Following are the advantages of the present disclosure: different endpoints of a service can now be configured with different capabilities and the network packet processing entities can now discover appropriate endpoints based on these capabilities; and facilities for service providers to provide different service endpoints with different capabilities and mechanisms for publishing their capabilities so appropriate endpoints can be selected during the endpoint selection processes.

Figure 7:
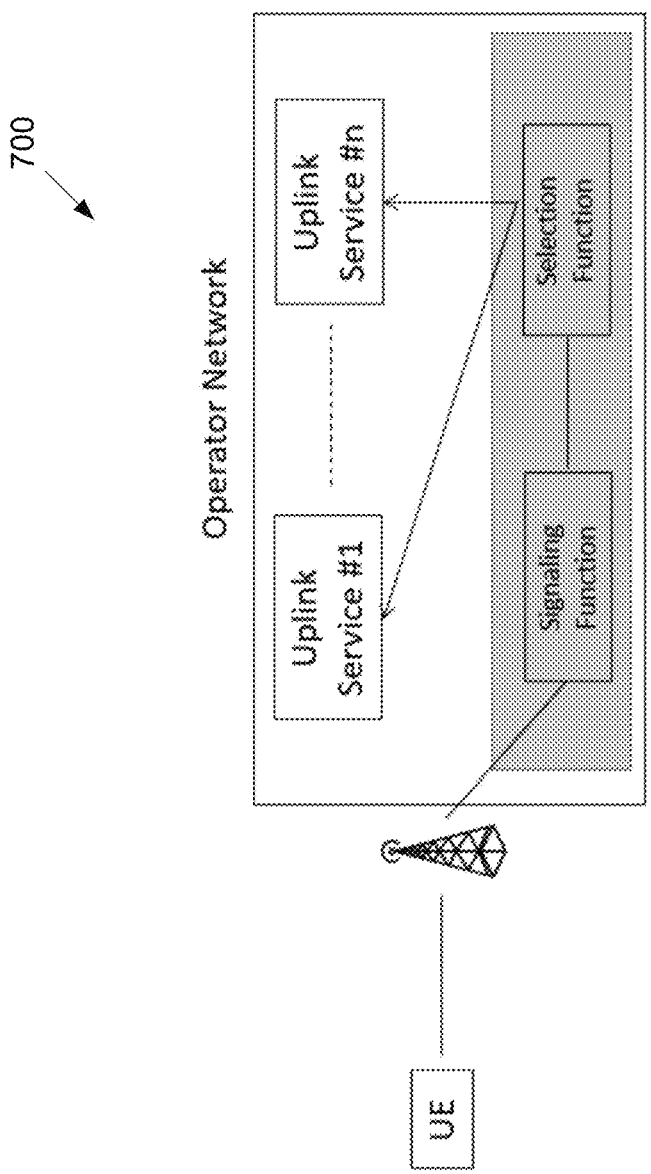
FIG. 7 illustrates another example uplink service architecture in operator's network according to embodiments of the present disclosure.

FIG. 7 illustrates another example uplink service architecture 700 in operator's network according to embodiments of the present disclosure. The embodiment of the uplink service architecture 700 illustrated in FIG. 7 is for illustration only. FIG. 7 does not limit the scope of this disclosure to any particular implementation.

FIG. 7 shows a simple architecture of operator network providing uplink services. The operator network provides a number of uplink services that can be accessed by the end users. The end user can connect to any of the uplink services and can avail the services provided by the service. Once the end user connects to an uplink service, the end user client can stream content to the uplink service. Depending on the end user interests and configuration, the uplink service can either store content for later distribution or start distributing the content to interested users.

For complete realization of the FLUS (Flexible Live Uplink Service) service, the end user client, on behalf of the end user indicates to the operator network that the end user client intends to use the services of an uplink service that provides certain features and capabilities. When the message processing entity of the operator network receives such a request the message processing entity of the operator network needs to select an uplink service endpoint that provides such a service with the requested capabilities. There is existing literature that specifies how different messages from the end user client can be diverted to different services.

In addition, there is lot of literature that describes how the destination endpoint is to be selected based on the destination information in the incoming messages from the end user client. However, such a mechanism implies that the end user client is already aware of the destination endpoint information and the network is just providing control and user plane paths to the requested destination. Such kind of mechanisms does not work when the end user client is not aware of the endpoint information of a server that is providing an uplink service of end user's choice. In this case, the end user client usually uses a generic service request (e.g., FLUS request) and relies on the capabilities of the operator network to divert the request to the appropriate destination endpoint.

In the present disclosure, a method is provided for selecting the appropriate end point for diverting the generic request from the end user client. As shown in FIG. 7, when the request from the end user client with a generic request reaches the operator network, the signaling function inside the operator network uses the selection function to select the appropriate uplink service endpoint. The selection of an appropriate uplink service endpoint is based on the capabilities of the uplink service endpoint as known to the Selection Function.

The selection function, based on the messages from the end user client, may select an uplink service endpoint and returns the information to the signaling function. When the signaling function receives the information about the appropriate uplink service endpoint from the selection function, the signaling function may divert the message from the end user client to the selected uplink service endpoint. When the uplink service endpoint receives the message forwarded by the signaling function, the uplink service endpoint can respond back to the end user client. The uplink service endpoint and the end user client may then continue with the session setup and the end user client can stream content as intended by the end user.

Figure 8:
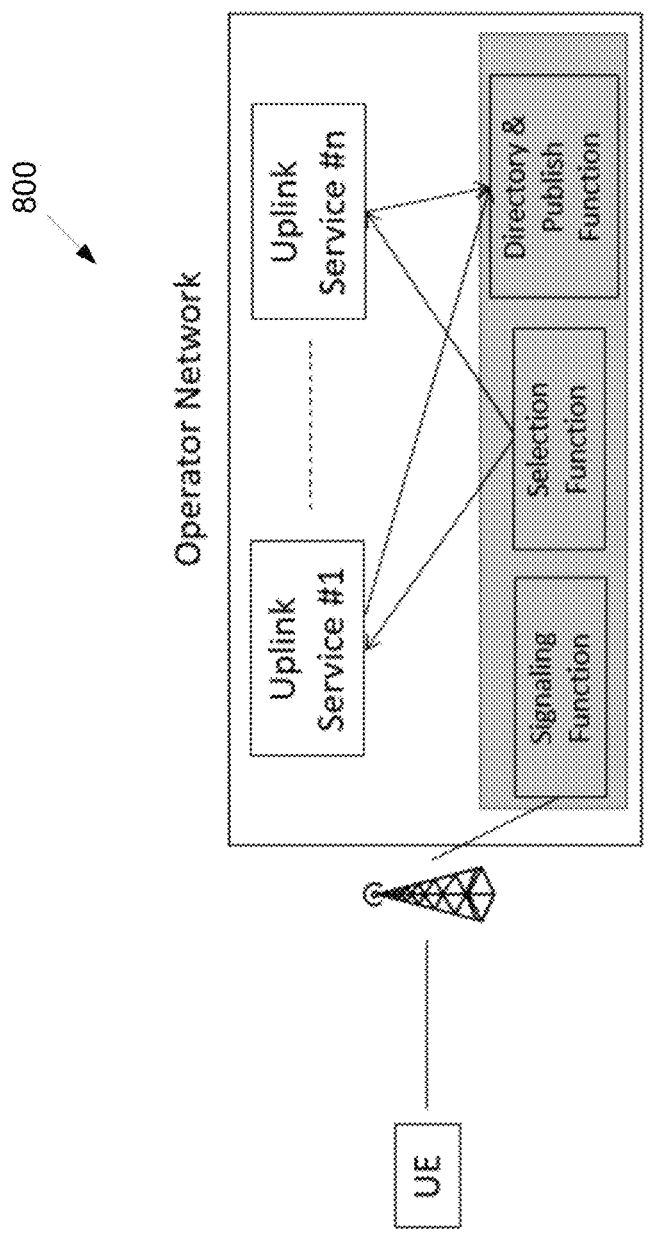
FIG. 8 illustrates an example publishing uplink service capabilities according to embodiments of the present disclosure.

FIG. 8 illustrates an example publishing uplink service capabilities 800 according to embodiments of the present disclosure. The embodiment of the publishing uplink service capabilities 800 illustrated in FIG. 8 is for illustration only. FIG. 8 does not limit the scope of this disclosure to any particular implementation.

As described above, the selection function may select the appropriate uplink service endpoint based on the capabilities of each of the uplink service endpoints in the operator domain. For this to be possible, the operator can setup a directory service to which all the uplink service endpoints may publish their capabilities. This is shown in FIG. 8.

As shown in FIG. 8, the operator can provide a directory & publish function for use of uplink services. Each uplink service endpoint may register each uplink service endpoint's capabilities with the directory & publish function. So, when the UE makes FLUS uplink service request, the signaling function can request the Selection Function for the endpoint information of the uplink service that can service the end users request. The selection function can then use the directory & publish function to infer the capabilities of each of the uplink service endpoints. Based on the inferred capabilities, the Selection Function can then inform the signaling function which may then forward the request to the selected uplink service endpoint as described before.

As described above, the capabilities of each of the uplink services can be published to the directory & publish Function. The kind of capabilities that can be published for uplink service endpoints are as shown in TABLE 7.

The FLUS uplink services can be provided for IMS users. So, operators providing IMS services to operators' end users can provision FLUS services and have their end users use IMS signaling and IMS service infrastructure for delivery of FLUS services.

Figure 9:
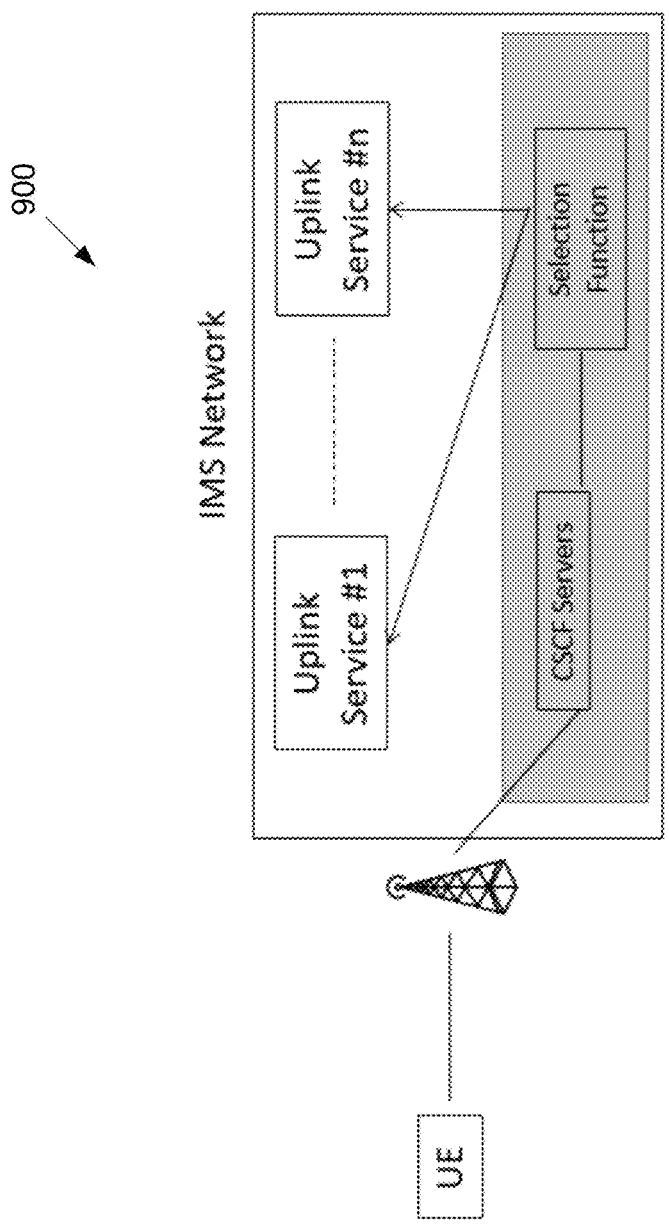
FIG. 9 illustrates an example uplink service in operator's IMS domain according to embodiments of the present disclosure.

FIG. 9 illustrates an example uplink service 900 in operator's IMS domain according to embodiments of the present disclosure. The embodiment of the uplink service 900 illustrated in FIG. 9 is for illustration only. FIG. 9 does not limit the scope of this disclosure to any particular implementation.

As shown in FIG. 9, with IMS, the end users use IMS signaling (using SIP and SDP protocols) to connect to the IMS network. The IMS clients can then request the Signaling Functions (e.g., CSCF's in IMS) for FLUS service. Upon receiving the FLUS service request as part of the SIP signaling request from the end user client, the CSCF server can use the selection function and directory & publish functions to select the appropriate uplink service endpoint. When the appropriate uplink service endpoint gets identified, the SIP signaling from the end user client (IMS client) is forwarded to the selected endpoint. Once the end point receives the SIP signaling request from the end user client for FLUS service, the endpoint can respond back to the end user client and both of them can continue the session setup process.

As described in the present disclosure, the capabilities of each of the uplink service endpoints are published in the directory & publish function. In IMS, such a function can be implemented as described in the aforementioned embodiments. For facilitating the directory service, each uplink service endpoint may act as an SIP application server (AS). Each uplink service AS may then publish each uplink service AS's capabilities to such directory service in the operator's IMS network.

For publishing of uplink service capabilities into the directory service, one of the following options can be followed. In one example of option 1 (SIP REGISTER), each of the uplink service AS can send each of the uplink service AS's capabilities to the directory service using SIP REGISTER method.

TABLE 7

List of capabilities of Uplink Service

| Capability | Description | Example |
|---|---|---|
| supported_features | List of supported features by the uplink service endpoint | 360 switching, rendering, exposure correction, color matching, feature tracking |
| media_support | Type of media supported | Audio, video |
| media_formats | Type of media formats supported | h.265, mp3 |
| transcoding | Supported content transcoding facilities indicated through supported audio, video, text, and other media formats | mp3, mpegts, mpeg2ts, mp4 |
| media descriptions | Details about individual media descriptions | |
| device capabilities | Supported end user device capabilities | Screen resolution(video, image), arrangement (camera rigs, individual capture devices etc.) |

As shown in TABLE 7, different capabilities of each of the uplink service endpoint along with the endpoint contact information can be stored in the directory & publish function. This information may form the basis for selection of appropriate uplink service endpoint when the FLUS session request comes from the end user client.

As messages with SIP REGISTER method allow registration of SIP entities, the uplink services can register their location and the uplink services' capabilities as shown below: an uplink service (example with URI sip: upserv1@flus.example.com) can register the uplink service's capabilities by sending the following SIP REGISTER method to the directory and service function (example with URI sip:dp.flus.example.com). The capabilities described in this example are not comprehensive and can include lot of addition details about the flus uplink service.

```
REGISTER sip:dp.flus.example.com SIP/2.0
Via: SIP/2.0/TCP client.example.com:5060
From: upserv1 <sip:upserv1@flus.example.com>
To: upserv1 <sip:upserv1@flus.example.com>
Call-ID: 123456789@flus.example.com
CSeq: 2 REGISTER
Contact: <sip:upserv1@client.example.com>
Authorization:Digest username="upserv1",
  realm="newyork.example.com",
  nonce="sadfh34jh2jkjaksdfhasjdfasf4324sd", opaque="",
  uri="sip:dp.flus.example.com",
  response="hfncywitlsg5489hd25hd75md9210hn5"
Content-Type: application/xml
Content-Length: 484
<?xml version="1.0" encoding="UTF-8" ?>
<flus>
    <supported_features>
      360 switching, rendering, exposure correction, color matching,
      feature tracking
    </supported_features>
    <media_support>
      <audio>
        <supported_format>
        mp3, mpeg1
        </supported_format>
      </audio>
      <video>
        <supported_format>
        h264,h265
        <supported_format>
      </video>
    </media_support>
    <client_device>
      <resolution>1920x1080</resolution>
      <multi_camera_support>true</multi_camera_support>
    </client_device>
</flus>.
```

For the above REGISTER request from the uplink service, the directory & publish function SIP endpoint can send back an acknowledgement as shown below:

```
SIP/2.0 200 OK
Via: SIP/2.0/TCP client.example.com:5060
From: upserv1 <sip:upserv1@flus.example.com>
To: upserv1 <sip:upserv1@flus.example.com>
Call-ID: 123456789@flus.example.com
CSeq: 2 REGISTER
Contact: <sip:upserv1@client.example.com;expires=3600
Content-Length: 0.
```

As described in the SIP REGISTER exchange above, each flus uplink service can register each flus uplink service's capabilities to the directory & publish function in the IMS network.

In one example of Option 2 (SIP OPTIONS), the directory service can function in a UAC role and request the capabilities of each uplink service endpoint using the SIP OPTIONS method. When each of the uplink service endpoints receive such a SIP OPTIONS method request from the directory service UA, each of the uplink service endpoints can respond back to the directory service UA with details of each of the uplink service endpoints' capabilities.

For knowing the capabilities of an uplink service, the directory & publish function may know the SIP URI of the uplink service so the directory & publish function can send an OPTIONS query to that uplink service. The location of the uplink service can be known to the directory & publish function in two ways: the IMS network administrator statically configures the SIP URI of each of the uplink services in the directory & publish function so the IMS network administrator knows where to send the SIP OPTIONS query to; and optionally, each uplink service can register each uplink service's location with the directory & publish function using the SIP REGISTER request above, but without the service capabilities information. Once the directory & publish function knows the location, the directory & publish function can send an OPTIONS query to the uplink service.

Once the directory & publish function knows the SIP URI (or location) using any of the methods described above, the directory & publish function can send an OPTIONS query to each of the uplink service. For example, below is an SIP OPTIONS message to an uplink service requesting capabilities:

```
OPTIONS sip:upserv1@flus.example.com SIP/2.0
Via: SIP/2.0/UDP client.example.com;
From: DP<sip:sip:dp.flus.example.com>; tag=hgd567fg
To: upserv1<sip:upserv1@flus.example.com>
Call-ID: 12345678@@flus.example.com
Contact: DP<sip:dp@flus.example.com>
CSeq: 1 OPTIONS
Accept: application/xml
Content-Length: 0.
```

When the uplink service gets an OPTIONS request from the directory & publish function, the uplink service can respond back with the uplink service's capabilities in the 200 OK message as shown below:

```
SIP/2.0 200 OK
Via: SIP/2.0/UDP client.example.com;
From: DP<sip:sip:dp.flus.example.com>; tag= hgd567fg
To: upserv1<sip:upserv1@flus.example.com>; tag=ki4fag46
Call-ID: 12345678@flus.example.com
CSeq: 1 OPTIONS
Allow: INVITE, ACK, CANCEL, OPTIONS, BYE
Supported: newfield
Content-Length: 484
Content-Type: application/xml
<?xml version="1.0" encoding="UTF-8" ?>
<flus>
    <supported_features>
      360 switching, rendering, exposure correction, color matching,
      feature tracking
    </supported_features>
    <media_support>
      <audio>
        <supported_format>
        mp3, mpeg1
        </supported_format>
      </audio>
      <video>
        <supported_format>
        h264,h265
        <supported_format>
      </video>
    </media_support>
    <client_device>
      <resolution>1920x1080</resolution>
      <multi_camera_support>true</multi_camera_support>
    </client_device>
</flus>.
```

The directory & publish function can send such OPTIONS query to each uplink service in the IMS domain and the directory & publish function can receive the capabilities of all the uplink services in the IMS domain.

In one example of option 3 (using SIP MESSAGE), each of the uplink service AS can send each of the uplink service AS's capabilities to the directory service using SIP MES- SAGE method. As messages with SIP MESSAGE method allows sending of textual data, the uplink server endpoint can send each of the uplink service AS's capabilities to the directory service.

For the uplink service to send the uplink service's capabilities using SIP MESSAGE, the uplink service may have a SIP session with a SIP UA provisioned in the IMS network. Once the uplink service sets up a session, the uplink service can send the following SIP MESSAGE request to inform the IMS network of the uplink service's capabilities:

```
MESSAGE sip:uadp@flus.example.com SIP/2.0
Via: SIP/2.0/TCP client.example.com;branch=asdjfhasdf78yuhs
Max-Forwards: 70
From: sip:upserv1@flus.example.com;tag=83474
To: sip:uadp@flus.example.com
Call-ID: 1234567890@flus.example.com
CSeq: 1 MESSAGE
Content-Type: application/xml
Content-Length: 484
<?xml version="1.0" encoding="UTF-8" ?>
<flus>
    <supported_features>
      360 switching, rendering, exposure correction, color matching,
      feature tracking
    </supported_features>
    <media_support>
      <audio>
      <supported_format>
      mp3, mpeg1
      </supported_format>
      </audio>
      <video>
      <supported_format>
      h264,h265
      <supported_format>
      </video>
    </media_support>
    <client_device>
      <resolution>1920x1080</resolution>
      <multi_camera_support>true</multi_camera_support>
    </client_device>
</flus>.
```

When the SIP UA in the IMS network receives the above SIP MESSAGE request, the SIP UA can store the capabilities of the uplink service so the uplink service can be discovered when necessary.

In one example of Option 4 (using SIP INFO), each of the uplink service AS can send each of the uplink service AS capabilities to the directory service using SIP INFO method.

For the uplink service to send the uplink service's capabilities using SIP INFO request, the uplink service may have a SIP session with a SIP UA provisioned in the IMS network. During the SIP session setup, for an INVITE request from the uplink service, the SIP UA, in the SIP UA's 200 OK response to the uplink service, may indicate support that the SIP UA may receive INFO requests for package "flus" as described in the aforementioned embodiments. Once the uplink service sets up a session, the uplink service can send the following SIP INFO request to inform the IMS network of the uplink service's capabilities:

```
INFO sip:uadp@flus.example.com SIP/2.0
Via: SIP/2.0/TCP client.example.com;branch=asdjfhasdf78yuhs
Max-Forwards: 70
From: sip:upserv1@flus.example.com;tag=83474
To: sip:uadp@flus.example.com
Call-ID: 1234567890@flus.example.com
CSeq: 1 INFO
Info-Package: flus
```

-continued

```
Content-type: application/flus
Content-Disposition: Info-Package
Content-Length: 484
<?xml version="1.0" encoding="UTF-8" ?>
<flus>
    <supported_features>
      360 switching, rendering, exposure correction, color matching,
      feature tracking
    <supported_features>
    <media_support>
      <audio>
      <supported_format>
      mp3, mpeg1
      </supported_format>
      </audio>
      <video>
      <supported_format>
      h264,h265
      <supported_format>
      </video>
    </media_support>
    <client_device>
      <resolution>1920x1080</resolution>
      <multi_camera_support>true</multi_camera_support>
    </client_device>
</flus>.
```

When the SIP UA in the IMS network receives the above SIP INFO request, the SIP UA can store the capabilities of the uplink service so the uplink service can be discovered when necessary.

Using any of the options defined above, the directory service gets to know the capabilities of each of the uplink service endpoints in the operator's IMS network.

As described in the aforementioned embodiments, with IMS, the FLUS end user client (IMS client) may send a request to the IMS network which the IMS network message processing entities (CSCF servers) forward to the appropriate uplink service endpoint. The selection of the appropriate uplink service endpoint is based on the capabilities of uplink service AS servers implementing FLUS services as described in the aforementioned embodiments.

For the IMS network to perform selection of appropriate uplink service endpoints, it may need: information from the IMS FLUS clients about the capabilities requiring for the FLUS service; and metadata describing the end user client's media and capture information and the end user client's capabilities.

The UE capability information described above cannot be exchanged using the mechanisms described in the known-reference as the mechanisms that are used to provide client's preferences to the server which are usually static. However, for FLUS service, the UE capabilities might vary for every session with a FLUS service. In addition, the caller preferences described in the known-reference do not provide any tags for exchange of capabilities required for FLUS service.

The IMS clients can perform one of the following to inform the IMS network about the IMS clients' own capabilities, media and capture information, and capabilities required for the FLUS service In one example of Option 1 (using new SIP custom header), IMS client can use a new SIP header called "P-FLUS-Service" in the IMS client's SIP INVITE message to the IMS network. As value of this header, the IMS client can include all the details described in the aforementioned embodiments.

An example SIP INVITE request with the above custom header can be shown as follows:

```
INVITE sip:flus@flus.example.com SIP/2.0
Via: SIP/2.0/UDP client.example.com;branch=hdj84hchd53960nf
Max-Forwards: 70
To: <sip:flus@flus.example.com>
From: flusUE1 <sip:ue1@atlanta.com>;tag=89543267
Call-ID: 1234567890@flus.example.com
CSeq: 34554 INVITE
Contact: <sip:ue1@pc10.atlanta.com>
P-FLUS-Service: FLUS-Req-Feature="360 switching",
Video-Format="h265", Number-of-Cameras=2
Content-Type: application/sdp
Content-Length: 136
v=0
o=tflus 3493975390 27485321 IN IP4 192.168.1.21
s=flus-session
c=IN IP4 192.168.1.21
t=0 0
m=video 49170 RTP/AVP 98
a=rtpmap:98 H265/90000.
```

As shown in the above SIP INVITE request, a UE is requesting session setup with an uplink service which can provide a 360 stitching service for video with two camera feeds in h265 format. These capabilities are included in the P-FLUS-Service custom header. The SDP in the INVITE contains information where the SDP can receive the final stitched video.

When the IMS network receives the above SIP INVITE request, the IMS network can extract the UE requested feature (360 stitching in above message example) and feature metadata (video format, number of cameras), find an uplink service that provides the above feature supporting the requested metadata. Once the IMS network finds an uplink service that supports this feature and metadata using the directory & publish function (e.g., upserv1 described earlier), the IMS network forwards the INVITE request to that uplink service (upserv1).

The uplink service (upserv1) may then complete the session setup. The SDP in the response from the uplink service may indicate two media descriptions describing where the SDP can receive the two camera feeds originating from the UE. Once the UE and the uplink service perform the session setup, the UE can stream the two camera feeds as RTP stream. The uplink service may then perform the requested service (360 video stitching) and may respond back with the stitched video to the UE.

In one example of option 2 (using SIP MESSAGE), IMS client can perform a regular IMS session setup with a user agent setup by the operator in the IMS network. Upon successfully establishing the IMS session, the IMS client uses SIP MESSAGE method to indicate all the details described in the aforementioned embodiments. When the SIP UA in the IMS network receives this message, the SIP UA can extract the details of the IMS client and then perform the appropriate uplink service selection mechanism described in the aforementioned embodiments.

For the IMS client to use SIP MESSAGE request to inform the IMS network about the service the IMS client requires, the IMS client (UE) can first setup a SIP session as described in the aforementioned option 1 without the SIP custom header P-FLUS-Service. The session is setup with a SIP UA provisioned by the IMS operator. Once the UE has a SIP session with the SIP UA in the IMS network, the UE can send the following SIP MESSAGE request to inform the IMS network about the services the UE requires:

```
MESSAGE sip:flus@flus.example.com SIP/2.0
Via: SIP/2.0/TCP client.example.com;branch=asdjfhasdf78yuhs
Max-Forwards: 70
From: sip:ue1@atlanta.com;tag=83474
To: sip:flus@flus.example.com
Call-ID: 1234567890@flus.example.com
CSeq: 1 MESSAGE
Content-Type: application/xml
Content-Length: 300
<?xml version="1.0" encoding="UTF-8" ?>
<flus>
    <FLUS-Req-Feature>
    360 switching
    </ FLUS-Req-Feature >
    <media>
        <video>
            <video_format>
            h265
            <video_format>
        </video>
    </media>
<client_device>
    <resolution>1920x1080</resolution>
    <number_of_camera>2</number_of_camera>
</client_device>
</flus>.
```

As shown in the above SIP MESSAGE request, the UE informs the IMS network of the uplink service the UE requires. In the xml body above, the UE indicates that the UE needs a 360 video stitching service with two camera feeds in h265 format. When the SIP UA in the IMS network receives this SIP MESSAGE request, the SIP UA uses the Directory & Publish function to find an uplink service that can provide the requested feature. Once the SIP UA finds the appropriate uplink service (e.g., upserv1 described earlier), the SIP UA can request the IMS client (UE) to do a SIP re-INVITE with the identified uplink service. Once the uplink service (upser1) receives the INVITE from the IMS client, the uplink service can proceed to complete the session setup with the IMS client and deliver the service as requested by the UE.

In one example of option 3 (using SIP INFO), IMS client can perform a regular IMS session setup with a user agent setup by the operator in the IMS network. Upon successfully establishing the IMS session, the IMS client uses SIP INFO method to indicate all the details described earlier in the aforementioned embodiments. When the SIP UA in the IMS network receives this SIP INFO message, the SIP UA can extract the details of the IMS client and then perform the appropriate uplink service selection mechanism described earlier.

For the IMS client (UE) to use SIP INFO request to inform the IMS network about the service the IMS client (UE) requires, the IMS client (UE) can first setup a SIP session as described in Option 2 without the SIP custom header P-FLUS-Service. The session is setup with a SIP UA provisioned by the IMS operator. When the SIP UA in the IMS network responds back to the UE with a 200 OK response, the SIP UA can indicate to the UE that the SIP UA may receive INFO requests for package "flus."

Once the UE has a SIP session with the SIP UA in the IMS network, the UE can send the following SIP INFO request to inform the IMS network about the services the UE requires:

```
INFO sip:alice@pc33.example.com SIP/2.0
Via: SIP/2.0/UDP 192.0.2.2:5060;branch=z9hG4bKnabcdef
To: Bob <sip:bob@example.com>;tag=a6c85cf
```

```
From: Alice <sip:alice@example.com>;tag=1928301774
Call-Id: a84b4c76e66710@pc33.example.com
CSeq: 314333 INFO
Info-Package: flus
Content-type: application/flus
Content-Disposition: Info-Package
Content-length: 300
<?xml version="1.0" encoding="UTF-8" ?>
<flus>
    <FLUS-Req-Feature>
    360 switching
    </ FLUS-Req-Feature >
    <media>
        <video>
            <video_format>
            h265
            <video_format>
        </video>
    </media>
<client_device>
    <resolution>1920x1080</resolution>
    <number_of_camera>2</number_of_camera>
</client_device>
</flus>.
```

As shown in the above SIP INFO request, the UE informs the IMS network of the uplink service the UE requires. In the INFO message body above, the UE indicates that the UE needs a 360 video stitching service with two camera feeds in h265 format. When the SIP UA in the IMS network receives this SIP INFO request, the SIP UA uses the directory & publish function to find an uplink service that can provide the requested feature. Once the SIP UA finds the appropriate uplink service (e.g., upserv1 described earlier), the SIP UA can request the IMS client (UE) to do a SIP re-INVITE with the identified uplink service. Once the uplink service (upser1) receives the INVITE from the IMS client, the uplink service can proceed to complete the session setup with the IMS client and deliver the service as requested by the UE.

In one embodiment, mechanisms are provided for discovery of uplink services using the message processing entities of the IMS network. It is possible that the discovery of FLUS sinks (uplink service endpoints) can be performed using FLUS Management Object which gets provisioned in the UE's device.

The FLUS Management Object may have a management object identifier: "urn:oma:mo:ext-3gpp-flus:1.0". The MO may be compatible with OMA Device Management protocol specification version 1.2 and above as described in [OMA-ERELD_DM-VI].

In one embodiment, the following nodes for FLUS configuration are provided.

In one example of Node: /<X>, this interior node specifies the unique object id of a FLUS management object. The purpose of this interior node is to group together the parameters of a single object: occurrence (ZeroOrOne); format (node); and minimum access types (Get).

The following interior nodes may be contained if the FLUS sink in the terminal supports the FLUS Management Object.

In one example of /<X>/Sink/<X>, this node is a collection of information about a FLUS Sink: occurrence (OneOrMore); format (node); and minimum access types (Get).

In one example of /<X>/Sink/<X>/SIPURI, this leaf node provides the SIP URI for the FLUS sink that is described by the parent node: occurrence (One); format (string); and minimum access types (Get).

In one example of/<X>/Sink/<X>/Capabilities, this leaf node provides a URL to the XML document that describes the capabilities of the FLUS sink. The document may follow the syntax and semantics described by the data model: occurrence (ZeroOrOne); format (string); and minimum access types (Get).

In one embodiment, mechanisms are provided for discovery of uplink services using the message processing entities of the IMS network. It is possible that the discovery of FLUS sinks (uplink service endpoints) can be performed using DNS discovery.

If discovery is performed using DNS, a DNS SRV RR request may be sent to the DNS server using the pre-provisioned FQDN: flus.mnc<MNC>.mcc<MCC>.pub.3gppnetwork.org.

The response may contain a list of one or more FLUS sinks that are recommended by the network. A TXT RR record may be included to provide a corresponding capability URL for each of the included FLUS sinks in the SRV RR response.

In one embodiment, mechanisms are provided for discovery of uplink services using the message processing entities of the IMS network. It is possible that the discovery of FLUS sinks (uplink service endpoints) can be performed by the network.

The UE may be provisioned with a FLUS URI, e.g. sink@flus.mnc<MNC>.mcc<MCC>.pub.3gppnetwork.org, in which case, the selection of the FLUS Sink is performed transparently by the S-CSCF.

To assist the S-CSCF with the correct routing of the SIP INVITE request, additional information may be provided as part of the request URI.

The following tag is defined for this purpose: "flus-requirements" and the value may be a URL that points to a document that describes the data model.

An IMS-based FLUS session is established in the same way as a regular MTSI session using a SIP INVITE message. The SDP may include at least one send only media session. Furthermore, to identify that media session as a FLUS session, each FLUS media line may contain an attribute "a=3gpp-flus" with the following ABNF syntax:

FLUS-attribute="a=3gpp-flus:" stream-id SP "configuration=" config stream-id=1*5DIGIT; provides an identifier of this FLUS component config=<base64-encoded value>; provides a configuration of the current FLUS component as a base64 encoded j son representation of the data model as described in TABLE 7.

An example of the initial SIP INVITE with the SDP offer is provided here:

```
INVITE
sip:flusB@flus.mnc12.mcc14.pub.3ggpnetwork.org;flus-requirements=http://flus.example.com/rig/12/datamodel.json SIP/2.0
Via: SIP/2.0/UDP here.com:5060
From: UE <sip:UE@example.com>
To: FLUSSink <sip:flus@flus.mnc12.mcc14.pub.3ggpnetwork.org>
Call-ID: 12345601@example.com
CSeq: 1 INVITE
Contact: <sip:UE@100.100.100.100>
```

```
Content-Type: application/sdp
Content-Length: 3457
    m=video 48092 RTP/AVPF 104
    b=AS:240
    b=RS:0
    b=RR:2500
    a=rtpmap:104 H264/90000
    a=fmtp:104 packetization-mode=0; profile-level-id=42e00c; \
      sprop-parameter-sets=J0LgDJWgUH6Af1A=,KM46gA==
    a=sendonly
    a=3gpp-flus:1                                          configuration=
    VGhhbmsgeW91IGZvciBkZWNvZGluZyB0aGlzLiBGTFVTIGlzIGF3ZXNvbWUu
    m=video 48094 RTP/AVPF 104
    b=AS:240
    b=RS:0
    b=RR:2500
    a=rtpmap:104 H264/90000
    a=fmtp:104 packetization-mode=0; profile-level-id=42e00c; \
      sprop-parameter-sets=J0LgDJWgUH6Af1A=,KM46gA==
    a=sendonly
        a=3gpp-flus:2                                      configuration=
        VGhpcyBpcyB0aGUgc2Vjb25kIGNvbXBvbmVudCBvZiB0aGlzIEZMVVMgZXhh
        bXBsZS4gVGhhbmtzLg==.
```

Figure 10:
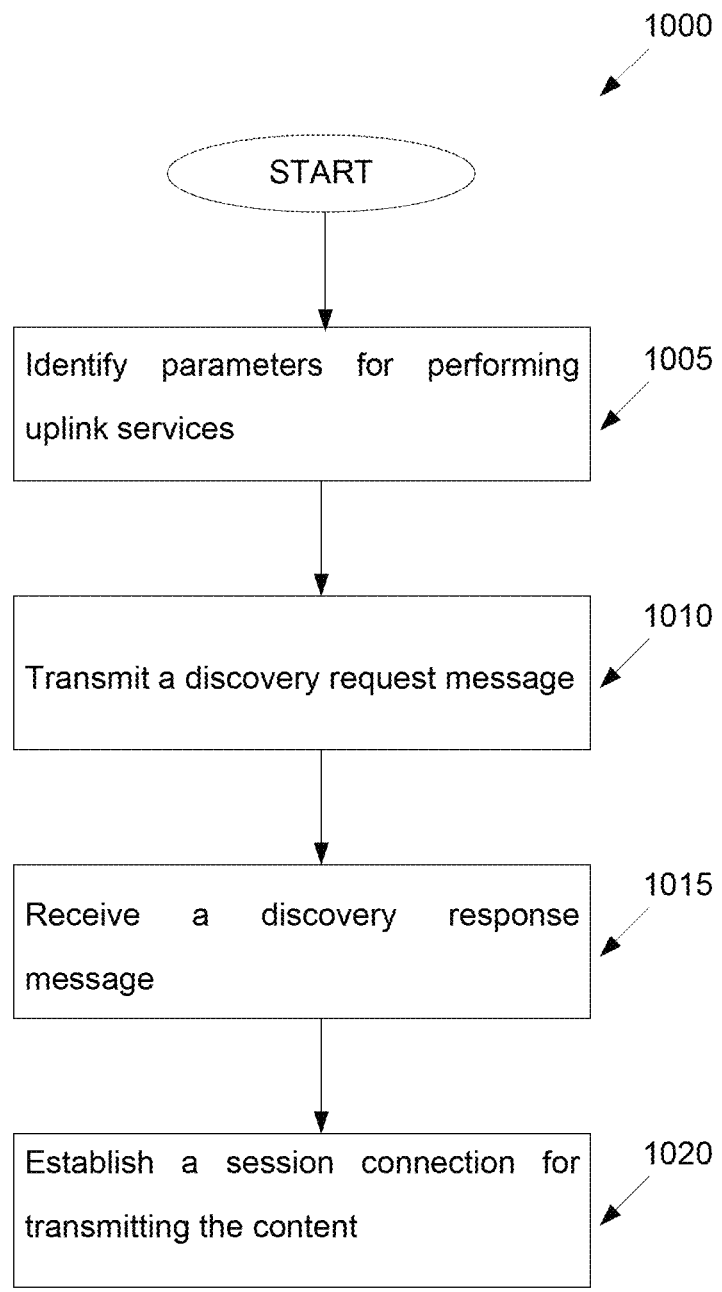
FIG. 10 illustrates an example flow chart of a method for discovery and access uplink services according to embodiments of the present disclosure.

FIG. 10 illustrates an example flow chart of a method 1000 for discovery and access uplink services according to embodiments of the present disclosure, as may be performed by an uplink device. The embodiment of the method 1000 illustrated in FIG. 10 is for illustration only. FIG. 10 does not limit the scope of this disclosure to any particular implementation.

As shown in FIG. 10, the method 1000 begins at step 1005. At step 1005, the device (e.g., 111-116 as illustrated in FIG. 1) identifies parameters for processing the uplink streams of an uplink service. At step 1005, the receiving device of the uplink streams is dynamically selected based on at least one of characteristics, capabilities, or requirements associated with the device. At step 1005, the set of parameters to capture the uplink stream comprises at least one of a required bandwidth or requested processing steps.

At step 1010, the device transmits, to a network entity, a discovery request message including the parameters for discovery of the receiving device capable of processing the uplink stream. At step 1010, the discovery request message includes a set of parameters for a camera system.

At step 1015, the device receives, from the network entity, a discovery response message including information of the receiving device of the uplink streams.

In one embodiment, at step 1015, the device receives, from the network entity, information including a list of available uplink services. In such embodiment, the device determines whether the information is available for establishing the session connection based on a DNS SRV record or a DNS TXT record received from the network entity.

In one embodiment, the device determines a common identifier value that is used for a service configuration with the uplink service and signaling messages used for a session setup with the uplink service.

At step 1020, the device establishes a session connection for transmitting the uplink streams to the receiving device for processing the uplink stream based on the discovery request and response messages. In one embodiment, at step 1020, a domain name system service (DNS SRV) record and a DNS text (DNS TXT) record include a location of the uplink service, and wherein the uplink service is a framework for live uplink streaming (FLUS) service.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A device for discovering a service for uplinking streams, the device comprising:
    a processor configured to:
        identify parameters for processing uplink streams by an uplink service, the parameters indicating configuration options for the uplink service, and
        generate a discovery request message to identify an uplink service, from among a plurality of uplink services, capable of processing the uplink streams from the device for distribution to other devices, the discovery request message including the identified parameters and a set of parameters for a corresponding bandwidth for the uplink streams; and
    a transceiver operably connected to the processor, the transceiver configured to:
        transmit, to a network entity, the discovery request message; and
        receive, from the network entity, a discovery response message including information of the uplink service of the uplink streams,
    wherein the processor is further configured to establish a session connection for transmitting the uplink streams to the uplink service for processing the uplink streams based on the discovery request and response messages.

2. The device of claim 1, wherein the uplink service of the uplink streams is an uplink service provider, and is dynamically selected from among a plurality of uplink service providers based on at least one of characteristics, capabilities, or requirements associated with the device.

3. The device of claim 1, wherein the set of parameters comprises at least one of a camera system or requested processing steps.

4. The device of claim 1, wherein a domain name system service (DNS SRV) record and a DNS text (DNS TXT) record include a location of the uplink service.

5. The device of claim 1, wherein:
the transceiver is further configured to receive, from the network entity, information including a list of available uplink services; and
the processor is further configured to determine whether the information is available for establishing the session connection based on a DNS SRV record or a DNS TXT record received from the network entity.

6. The device of claim 1, wherein the uplink service is a framework for live uplink streaming (FLUS) service.

7. The device of claim 1, wherein the processor is further configured to determine a common identifier value that is used for a service configuration with the uplink service and signaling messages used for a session setup with the uplink service.

8. A network entity for discovering a service for uplinking streams, the network entity comprising:
a transceiver configured to:
receive, from a device, a discovery request message for discovery of an uplink service, from among a plurality of uplink services, that is capable of processing uplink streams from the device for distribution to other devices, wherein the discovery request message includes parameters indicating configuration options for the uplink service and a set of parameters for a corresponding bandwidth for the uplink streams; and
transmit, to the device, a discovery response message including information of the uplink service of the uplink streams; and
a processor operably connected to the transceiver, the processor configured to:
identify the parameters for processing the uplink streams of an uplink service from the device; and
establish a session connection for receiving the uplink streams from the device for processing the uplink streams based on the discovery request and response messages.

9. The network entity of claim 8, wherein the uplink service of the uplink streams is an uplink service provider, and is dynamically selected from among a plurality of uplink service providers based on at least one of characteristic, capabilities, or requirements associated with the device.

10. The network entity of claim 8, wherein a directory of the uplink service is published using domain name system service (DNS SRV) record and a DNS text (DNS TXT) record, and wherein the set of parameters to capture the uplink streams comprises at least one of a camera system or requested processing steps.

11. The network entity of claim 10, wherein the DNS SRV record and the DNS TXT record include a location of the uplink service.

12. The network entity of claim 8, wherein:
the transceiver is further configured to transmit, to the device, information including a list of available uplink services; and
the processor is further configured to determine whether the information is available for establishing the session connection based on a DNS SRV record or a DDNS TXT record transmitted to the device.

13. The network entity of claim 8, wherein the uplink service is a framework for live uplink streaming (FLUS) service.

14. The network entity of claim 8, wherein the processor is further configured to determine a common identifier value that is used for a service configuration with the uplink service and signaling messages used for a session setup with the uplink service.

15. A method of a device for discovering a service for uplinking streams, the method comprising:
identifying parameters for processing uplink streams by an uplink service, the parameters indicating configuration options for the uplink service;
generating a discovery request message to identify an uplink service, from among a plurality of uplink services, capable of processing the uplink streams from the device for distribution to other devices, the discovery request message including the identified parameters and a set of parameters for a corresponding bandwidth for the uplink streams;
transmitting, to a network entity, the discovery request message;
receiving, from the network entity, a discovery response message including information of the uplink service of the uplink streams; and
establishing a session connection for transmitting the uplink streams to the uplink service for processing the uplink streams based on the discovery request and response messages.

16. The method of claim 15, wherein the uplink service of the uplink streams is an uplink service provider; and is dynamically selected from among a plurality of uplink service providers based on at least one of characteristics, capabilities, or requirements associated with the device.

17. The method of claim 15, wherein the set of parameters comprises at least one of a camera system or requested processing steps.

18. The method of claim 17, wherein a domain name system service (DNS SRV) record and a DNS text (DNS TXT) record include a location of the uplink service, and wherein the uplink service is a framework for live uplink streaming (FLUS) service.

19. The method of claim 15, further comprising:
receiving, from the network entity, information including a list of available uplink services; and
determining whether the information is available for establishing the session connection based on a DNS SRV record or a DNS TXT record received from the network entity.

20. The method of claim 15, further comprising determining a common identifier value that is used for a service configuration with the uplink service and signaling messages used for a session setup with the uplink service.

* * * * *